July 8, 1930.  J. SOUSEDIK  1,770,345

MOTOR CONTROL SYSTEM

Filed Dec. 22, 1928

J. Sousedik
INVENTOR

Patented July 8, 1930

1,770,345

UNITED STATES PATENT OFFICE

JOSEF SOUSEDIK, OF VSETIN, MORAVIA, CZECHOSLOVAKIA

MOTOR-CONTROL SYSTEM

Application filed December 22, 1928, Serial No. 327,877, and in Czechoslovakia September 16, 1927.

This invention relates to an improved electric drive for motor vehicles in which a motor is used in conjunction with a battery of accumulators, the motor acting at times as a generator.

The essence of the invention consists in this that the electric motor driving the vehicle has an over-compounded characteristic not only when it operates as a motor but also when it operates as a generator, so that the mechanical brake is dispensed with, the recovery of energy being attained by this that the kinetic energy of the moving vehicle is absorbed by the accumulators which are charged by the electric motor operating as an over-compounded generator. The expression "electric motor" is intended to include a plurality of motors. The starting is effected not only by connecting the motors in series and by changing over to parallel connection, but also, and mainly, by inserting the cells of the accumulator in the armature circuit, the use of starting resistances being dispensed with and the voltage of the motor being regulated by varying the number of cells inserted into the circuit, without any ohmic losses in resistances. For reducing the speed of the motors, the cells are disconnected and the torque of the generator is thereby regulated until the last cell is disconnected, whereupon the vehicle is brought to a standstill only by means of a hand-brake.

The electric motor driving the vehicle has an over-compounded characteristic also when the motor runs as a generator owing to the combined excitation, partly constant and mainly separate excitation, which, according to one mode, is automatically controlled by an electromagnetic change-over switch which changes over the series coils of the motor magnets according to the direction of the armature current in such a manner that the direction of the current in the series coils is always the same. The same result is obtained by using, instead of an electromagnetic change-over switch a motor generator consisting of an exciter producing the main excitation current and of a series motor inserted in the armature circuit of the electric motor driving the vehicle, so that its direction of rotation is always the same and the exciter delivers an excitation current always flowing in one and the same direction.

Figure 1:
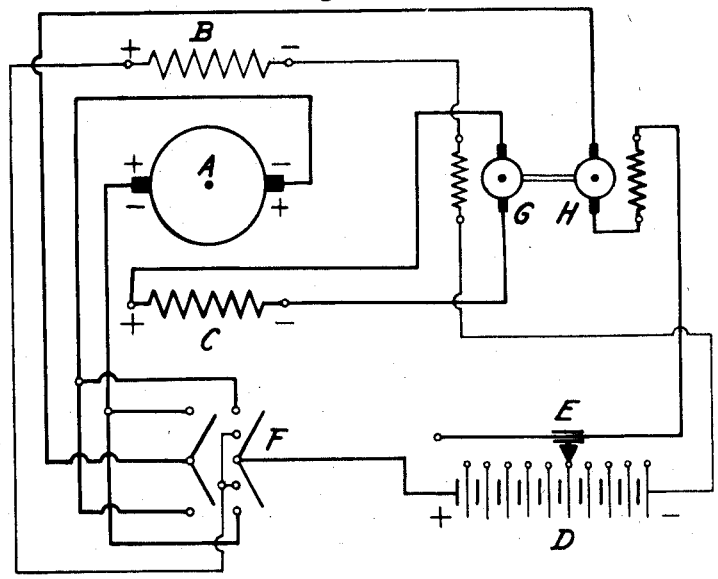
Figure 2:
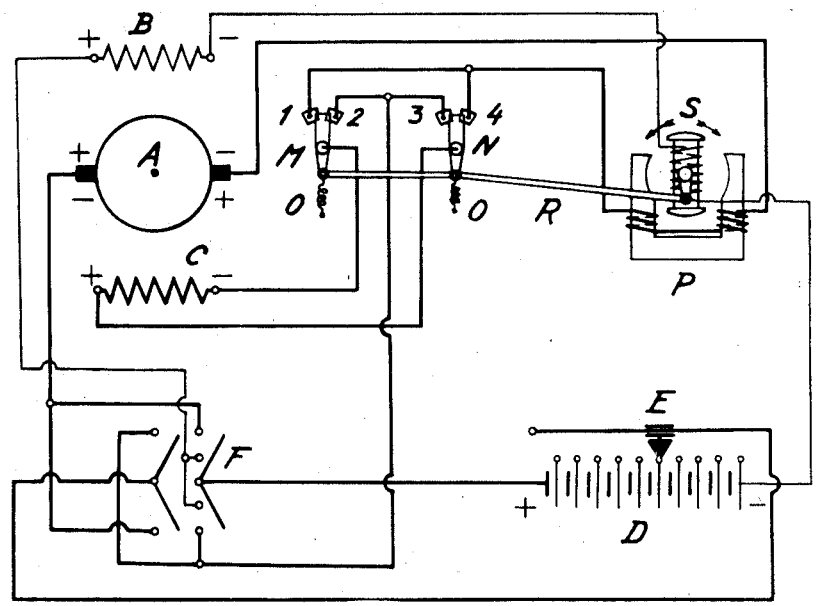

Two modes of carrying the invention into effect are illustrated diagrammatically and by way of example in Figures 1 and 2 of the accompanying drawings.

In the arrangement illustrated in Figure 1, the excitation can be determined by suitably dimensioning the armature windings of the motor-generator exciter.

The arrangement according to Fig. 1 consists of one or more electric motors A for driving the vehicle provided with a constant winding B and a separate excitation C and having an over-compounded characteristic, and of a battery of accumulators D. The excitation of the electric motor A by the winding B is constant, the latter winding being inserted into the circuit by a reversing switch F before the motor is started. The one pole of the armature of the motor A is connected over the reversing switch F to the first cell of the battery D and its other pole over the said switch and a series motor H to the battery switch E. The separate excitation winding C receives the current from a small generator G, which is driven by the series motor H. The generator G is provided with a constant excitation, its excitation winding being connected in series with the winding B.

The arrangement illustrated in Figure 2 similarly consists of one or more electric motors A provided with a shunt excitation winding B, and separate excitations C and having a series characteristic, and of a battery of accumulators D. The shunt excitation of the electric motor A is constant, the shunt winding being inserted into the circuit by a reversing switch F before the starting of the motor. In addition thereto, the device comprises an electromagnetic change-over switch M, N, S, P, and a battery switch E.

The motor generator G, H, illustrated in Fig. 1 comprises an ordinary series motor H and the generator G, which is suitably dimensioned to supply the current required for the separate excitation winding C of the electric motor A. The motor H is inserted in the main circuit of the motor A driving the vehicle, so that when the load of the latter motor varies, that is to say when the speed varies, the excitation of the motor A is also varied. The generator G is provided with separate constant excitation, which is inserted in the circuit of the excitation B of the motor A and provides current for the separately excited winding of the latter motor according to the speed of the same.

The automatically acting electromagnetic change-over switch shown in Fig. 2, comprises two single-pole change-over switches M, N, which are connected by the rod R with the armature S and which are kept in the dead position by springs O. The contacts 1, 2, and 3, 4, of the change-over switches M, N are so arranged that the contact arms always short-circuit the two contacts 1, 2, and 3, 4, respectively when they are in the dead position, so that the circuit of the motor armature A is closed through the battery, whilst the series winding C of the motor A is short-circuited. The change-over switch is actuated when a current is produced in the circuit of the motor armature, which current also flows through the winding provided on the field magnet P and which, according to the direction of the current, causes the armature S to be rocked to the right or to the left, and thereby the contact arms of the change-over switch M, N, to be moved either on to the contacts 1 and 3 or on to the contacts 2 and 4. In this way the series winding C of the motor A is inserted into the armature circuit of the motor, whereby a series characteristic is obtained when the machine runs as a motor as well as when it runs as a generator. The armature S of the automatic change-over switch is constantly magnetized by the battery D and is connected in series with the shunt winding B.

The reversing switch F shown in Figs. 1 and 2 serves for the purpose of inserting the constant excitation winding and the armature or armatures (rotors) into the circuit and for changing over the poles of the armature when the motors driving the vehicle run in the opposite direction.

The battery of accumulators D is provided with the battery switch E, the cells of the battery replacing the starter when the vehicle is being started, and the braking device when the cells are being disconnected until the whole of the battery is switched off. The first cells of the battery are made of larger capacity so that they are discharged in the same time as the other cells, although they are used more often than the others.

What I claim is:

1. A motor control system for motor vehicles comprising an electric motor having an armature and field windings, a storage battery, means for connecting one of said field windings and said armature to said battery for motor operation and regenerative braking and means for exciting said other winding, including electrical means responsive to the motor armature current for maintaining the excitation of said other field winding uni-directional, whereby the storage battery can be charged when the direction of the armature current is changed and said motor has a cumulative compound characteristic while running and braking.

2. A motor control system for motor vehicles comprising an electric motor having an armature, a separate excitation field winding and a constant excitation field winding, a storage battery, a reversing switch for connecting the said constant excitation field winding and said armature to the said battery for motor operation and regenerative braking and means for exciting the said separate excitation field winding including electrical means responsive to the motor armature current for maintaining the excitation of the separate excitation field winding uni-directional, which means comprise a motor-generator having a series motor in series with the said armature and a generator to supply current to the said separate excitation winding, whereby the storage battery can be charged when the direction of the armature current is changed and the electric motor first referred to has a cumulative compound characteristic while running and braking.

3. A motor control system as claimed in claim 1 and in which the storage battery is composed of a plurality of cells used for starting, speed regulation, braking and stopping and the capacities of the individual cells decrease in steps from the first to the last cell in order to take into account the different extent to which the various cells are used for the various operations.

In testimony whereof I have signed my name to this specification.

JOSEF SOUSEDIK.